United States Patent
Stratton et al.

(10) Patent No.: US 9,151,228 B2
(45) Date of Patent: Oct. 6, 2015

(54) SPLIT FUEL CONTROL MODULE

(71) Applicant: Solar Turbines Incorporated, San Diego, CA (US)

(72) Inventors: Darren Matthew Stratton, San Diego, CA (US); Gregory Lee Landrum, Mabank, TX (US)

(73) Assignee: Solar Turbines Incorporated, San Diego, CA (US)

( * ) Notice: Subject to any disclaimer, the term of this patent is extended or adjusted under 35 U.S.C. 154(b) by 470 days.

(21) Appl. No.: 13/712,390

(22) Filed: Dec. 12, 2012

(65) Prior Publication Data

US 2014/0157784 A1   Jun. 12, 2014

(51) Int. Cl.
*F02C 7/20* (2006.01)
*F02C 7/22* (2006.01)
*F02C 9/26* (2006.01)

(52) U.S. Cl.
CPC ... *F02C 9/26* (2013.01); *F02C 7/20* (2013.01); *F02C 7/222* (2013.01); *F02C 7/22* (2013.01); *F05D 2240/40* (2013.01); *F05D 2240/90* (2013.01); *F05D 2240/91* (2013.01)

(58) Field of Classification Search
CPC .............. F02C 7/20; F02C 7/22; F02C 7/222; F02C 9/26; F05D 2240/90; F05D 2240/91
USPC ........................................... 60/796, 797, 801

See application file for complete search history.

(56) References Cited

U.S. PATENT DOCUMENTS

| | | | | |
|---|---|---|---|---|
| 4,487,014 A | * | 12/1984 | Vinciguerra | 60/797 |
| 5,517,822 A | * | 5/1996 | Haws et al. | 60/618 |
| 6,230,481 B1 | * | 5/2001 | Jahr | 60/796 |
| 6,279,309 B1 | * | 8/2001 | Lawlor et al. | 60/772 |
| 2004/0261418 A1 | * | 12/2004 | Sandberg et al. | 60/785 |
| 2010/0162726 A1 | | 7/2010 | Robertson et al. | |
| 2012/0312707 A1 | * | 12/2012 | Baten | 206/319 |
| 2013/0097991 A1 | * | 4/2013 | Zhang et al. | 60/39.59 |
| 2014/0013768 A1 | * | 1/2014 | Laing et al. | 60/796 |

* cited by examiner

*Primary Examiner* — Phutthiwat Wongwian
*Assistant Examiner* — Rene Ford
(74) *Attorney, Agent, or Firm* — Procopio, Cory, Hargreaves & Savitch LLP

(57) ABSTRACT

A split fuel control module for a gas turbine engine and method of installation. The split fuel control module includes a first frame unit, a second frame unit, a segmented fuel path, and a distributed fuel controller. The first frame unit and the second frame unit are joined together at a frame unit interface. The segmented fuel path includes an upstream fuel interface fixed to the first frame unit and a downstream fuel interface fixed to the second frame unit and detachably coupled to the upstream fuel interface at the frame unit interface. A first portion of the distributed fuel controller is fixed to the first frame unit, and a second portion of the distributed fuel controller is fixed to the second frame unit.

20 Claims, 4 Drawing Sheets

SPLIT FUEL CONTROL MODULE

TECHNICAL FIELD

The present disclosure generally pertains to gas turbine engines, and is more particularly directed toward a fuel control module for a gas turbine engine.

BACKGROUND

Stationary gas turbine engines are typically assembled into a "gas turbine engine package". In particular, the gas turbine engine and certain support systems are installed on or within an enclosure on a support platform, keeping systems necessary to the turbine's operation together and in proximity. In some instances, certain support systems may be assembled during the build up of the support platform, before the actual installation of the gas turbine engine. In this way the support systems may be easily "dropped in" the support platform with minimal interference, and connected up to the gas turbine engine after it is installed.

U.S. Pat. App. Pub. No. 2010/0162726 Robertson et al. published on Jul. 1, 2010 shows a mobile platform system for a gas turbine engine. In particular, the disclosure of Robertson et al. is directed toward a system for moving an auxiliary component of a gas turbine engine. The system may have a mobile support platform configured to support the auxiliary component during operation of the gas turbine engine. The system may further have at least one guide assembly operably connected to the mobile support platform and configured to guide movement of the mobile support platform. The system may also have a drive assembly operably connected to the mobile support platform and configured to impart movement of the mobile support platform between an elevated position and a lowered position.

The present disclosure is directed toward overcoming known problems and/or problems discovered by the inventors.

SUMMARY OF THE DISCLOSURE

A split fuel control module for a gas turbine engine is disclosed herein. The split fuel control module includes a first frame unit, a second frame unit, a segmented fuel path, and a distributed fuel controller. The first and second frame units each include a base and an inner side joined together at substantially a right angle, respectively. The first and second frame units are joined together at a frame unit interface. The segmented fuel path includes a fuel inlet, a fuel outlet, an upstream fuel interface fixed to the first frame unit, and a downstream fuel interface fixed to the second frame unit and detachably coupled to the upstream fuel interface at the frame unit interface. The distributed fuel controller includes a primary fuel shut-off valve and a main fuel control valve. A first portion of the distributed fuel controller is fixed to the first frame unit, and a second portion of the distributed fuel controller is fixed to the second frame unit. According to one embodiment, a gas turbine engine package is also disclosed herein. The gas turbine engine package includes a gas turbine engine, a support platform, and the above split fuel control module fluidly coupled to the gas turbine engine, and mounted to the support platform.

DETAILED DESCRIPTION

The split fuel control module is a fuel control module for a gas turbine engine that is divided into individual frame units for installation, and assembled into a single frame module for operation. Each individual frame unit includes independent transport features and a coordinated frame unit interface for subsequent assembly. An individual unit includes a portion of the fuel train and is configured to be installed without the need to remove the gas turbine engine.

Figure 1:
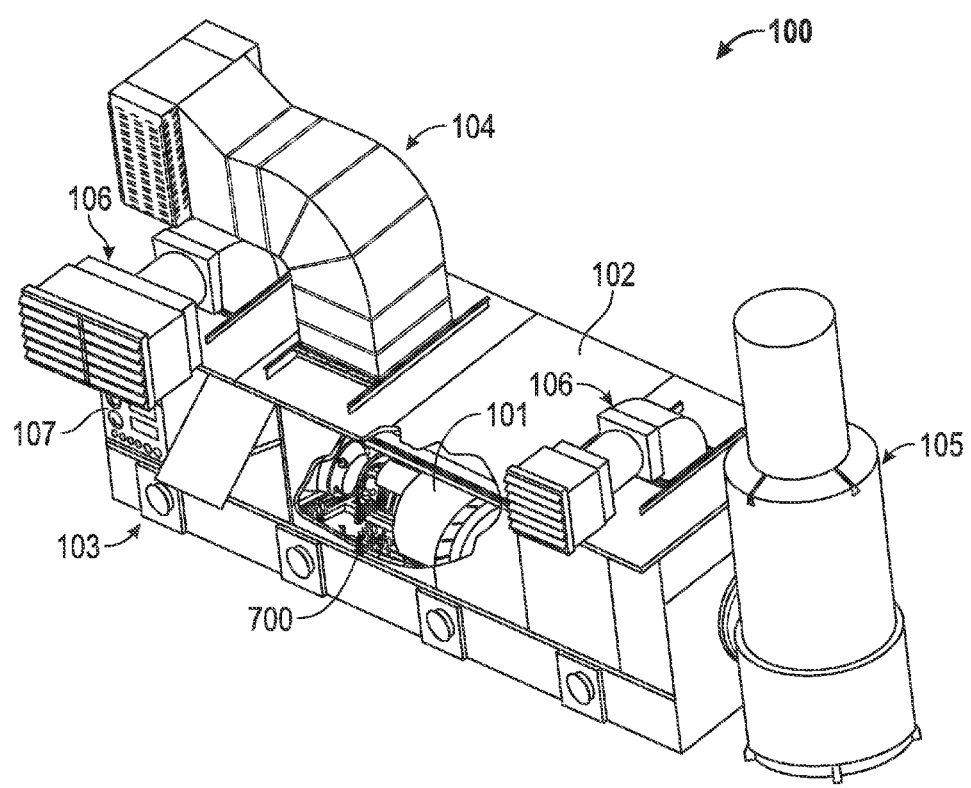
FIG. 1 is a cutaway isometric view of a gas turbine engine package.

FIG. 1 is a cutaway isometric view of a gas turbine engine package. Some of the surfaces have been left out or exaggerated (here and in other figures) for clarity and ease of explanation. In FIG. 1, some of the enclosure 102 has been cut away to show some the interior components.

The gas turbine engine package 100 may include a gas turbine engine 101, an enclosure 102, and a support platform 103. The gas turbine engine 101 may be mounted to and supported by the support platform 103. In addition, the gas turbine engine 101 may be housed in the enclosure 102. The gas turbine engine package 100 may also include one or more auxiliary features such as an inlet duct 104, an exhaust duct 105, one or more vents 106, and a control panel 107, for example.

Generally, the gas turbine engine 101 includes an inlet, a compressor, a combustor, a turbine, an exhaust, and a power output coupling. One or more of the gas turbine engine's 101 rotating components are coupled together by one or more rotating shafts.

Functionally, air enters the gas turbine engine inlet via the inlet duct 104 and is compressed by the compressor. Once compressed, the air leaves the compressor, and enters the combustor, where it is diffused and fuel is added. In particular, fuel is supplied to a plurality of fuel injectors from a fuel supply and via a fuel control module (here, split fuel control module 700). The split fuel control module 700 is located off of the gas turbine engine 101, but within the gas turbine engine package 100, and is fluidly coupled to the plurality of fuel injectors. After the combustion reaction, energy is then extracted from the combusted fuel/air mixture via the turbine. Exhaust gas then exits the system via the exhaust duct 105.

Various types of gaseous and liquid fuels may be directed into the combustor through fuel injectors. The gaseous fuel may include, for example, natural gas, landfill gas, bio-gas, syngas, etc. The liquid fuels may include diesel, kerosene, gasoline, or any other type of liquid fuel. In some applications, the gas turbine engine 101 may be operated primarily using a fuel that is cheaply available at the location where the gas turbine engine 101 is operating. For example, in an oil field with an abundant supply of natural gas, the gas turbine engine 101 may operate primarily using natural gas. In such applications, liquid fuel may be reserved for engine operating conditions where a liquid fuel may be more desirable. For instance, a liquid fuel may be directed to gas turbine engine 101 during startup and when combustion instabilities are detected in the combustor. After the gas turbine engine 101 reaches a stable operating condition, the liquid fuel supply to the gas turbine engine 101 may be turned off, and the gaseous fuel supply turned on.

Figure 2:
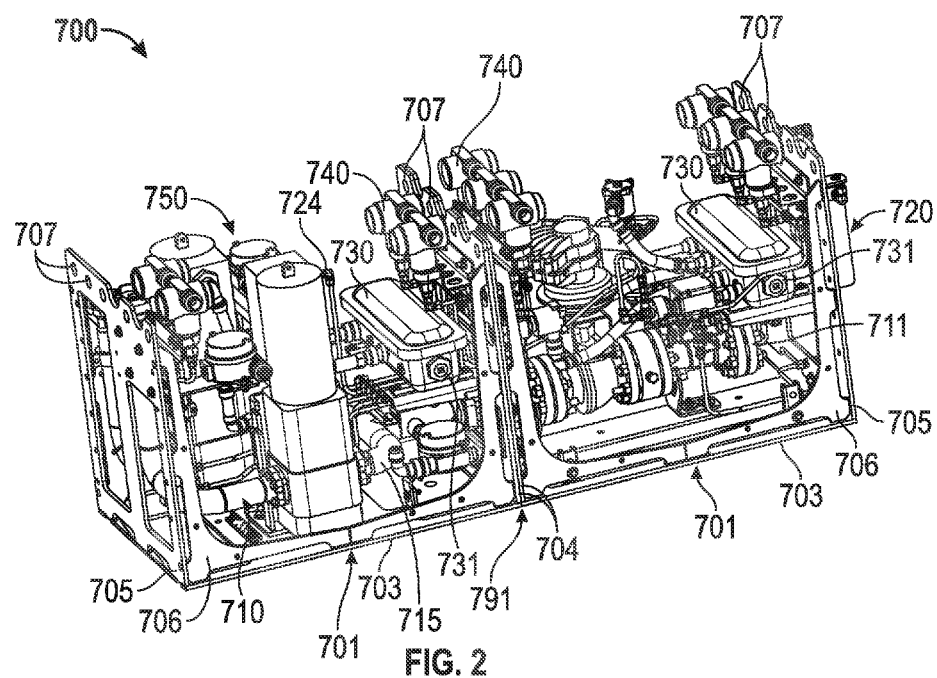
FIG. 2 is an isometric view of the exemplary split fuel control module of FIG. 1.

FIG. 2 is an isometric view of the exemplary split fuel control module of FIG. 1. In particular, the split fuel control module 700 is shown as a stand-alone structure having the functional components to control fuel flow to the injectors of a gas turbine engine. Some of the surfaces and plumbing have been left out or exaggerated for clarity and ease of explanation.

As illustrated, the split fuel control module 700 includes two frame units 701, a segmented fuel path 710, and a distributed fuel controller 750. The distributed fuel controller 750 generally includes the assorted controllers and devices that interface with the segmented fuel path 710, which includes the assorted interfaces and passageways that carry and distribute fuel through the split fuel control module 700.

The split fuel control module 700 may further include a segmented air path 720, one or more terminal boxes 730, one or more transmitters 740, and other componentry. As above, the segmented fuel path 710 generally includes the assorted interfaces and passageways that carry and distribute air or gas through the split fuel control module 700. According to one embodiment the split fuel control module 700 may include more than two frame units 701.

Each frame unit 701 supports a portion of the segmented fuel path 710, a portion of the segmented air path 720, and/or a portion of the distributed fuel controller 750. According to one embodiment, the split fuel control module 700 may include more than two frame units 701, each supporting a portion of the segmented fuel path 710, a portion of the segmented air path 720, and/or a portion of the distributed fuel controller 750.

Each frame unit 701 is joined together at a frame unit interface 791 to form the split fuel control module 700. According to one embodiment, the frame unit interface 791 may be a reference plane. According to another embodiment, the frame unit interface 791 may be a reference complex surface. In addition, segments of the segmented fuel path 710 are fluidly coupled together at the frame unit interface 791. Similarly, segments of the segmented air path 720 are fluidly coupled together at the frame unit interface 791.

Each frame unit 701 includes a base 703 and an inner side 704. The frame unit 701 may also include an outer side 705 located opposite the base 703 from the inner side 704. According to one embodiment, the inner side 704 and the outer side 705 may be joined to opposite ends of the base 703 and extend in the same direction, perpendicularly from the base 703, perpendicular meaning exactly perpendicular plus or minus five degrees in either direction. According to one embodiment, the base 703 may have a rectangular footprint and have a centerline 702 (FIG. 5) running between the inner side 704 and the outer side 705. According to one embodiment, the footprint of each frame unit 701 is limited not to exceed a vertical channel where the base 703 may be freely lowered alongside the gas turbine engine 101 to the support platform 103 (FIG. 1) without lateral contact.

The structural members forming each frame unit 701 are coupled together. In particular, the inner side 704 and the outer side 705 may be joined to the base 703 using fasteners, welded together, using locking joints, and/or using any conventional joining. According to one embodiment, the base 703, the inner side 704, and the outer side 705 may be formed from a single material.

The frame unit 701 may include at least one side support 706. Each side support 706 may be joined to the base 703 and to the inner side 704 and/or the outer side 705. Each side support 706 and may be configured structurally as a corner brace. In particular, each side support 706 may be configured to strengthen the frame unit 701 against loading on the joint between the base 703 and the inner side 704, and/or between the base 703 and the outer side 705.

According to one embodiment, the frame unit 701 may include four side supports 706, for example, where the base 703 is rectangular, one may be located at each corner between the base 703 and the inner side 704 and the outer side 705. Additionally, each side support 706 may couple to the base 703, and to the inner side 704 or the outer side 705, extending perpendicularly from the base 703. According to another embodiment, the frame unit 701 may include two side supports 706 extending the length of the base between the inner side 704 and the outer side 705. For example, where the base 703 is rectangular, each side support 706 may be coupled to and extend orthogonally from the first base 703, the first inner side 704, and the first outer side 705, orthogonal meaning exactly orthogonal plus or minus five degrees in any direction.

The structural members of the frame unit 701 may be made of corrosion resistant steel or any other suitable structural material. In addition, the structural members may be lightened by removing material and/or creating holes throughout the frame unit 701. According to one embodiment, material may be removed from the structural members to form functional features of the frame unit 701, as discussed further below.

The frame unit 701 includes transport features. In particular, the frame unit 701 may include a plurality of lifting devices 707 that couple with a mating transport device off of the frame unit 701, such as on a crane or other lifting machinery. For example, a lifting device 707 may include integrated features (e.g., openings, notches, hook arms, etc.) or added-on attachments (e.g., brackets, rings, hooks, etc.) that can couple with a crane attachment (e.g., hook, cable, rope, etc.) or the like. In this way, the frame unit 701 may be lifted, carried and lowered into position for assembly.

According to one embodiment, a lifting device 707 may include a section of the inner side 704 and/or a section of the outer side 705 configured to receive the crane attachment. In particular, the inner side 704 and/or the outer side 705 may include integrated features or added-on attachments. For example, as illustrated, lifting device 707 may include a plurality of openings in an upper portion of the inner side 704 and/or the outer side 705. The openings are perforations through the inner side 704 and/or the outer side 705. The plurality of openings may be round (as illustrated), or of any convenient shape. Moreover, as discussed above, plurality of openings may be oversized so as to incrementally reduce the weight of the frame unit 701, and thus make it more maneuverable.

According to one embodiment, the lifting devices 707 may include multiple lift configurations. In particular, the lifting devices 707 may incorporate balanced and/or off-balanced lift points. Moreover, the lifting devices 707 may incorporate symmetric and/or asymmetric lift points. For example, where the plurality of lifting devices 707 is made up plurality of openings in an upper portion of the inner side 704 and the outer side 705, four openings (two on the inner side 704 and two on the outer side 705) may be positioned such that, when the frame unit 701 is lifted, the base 703 is balanced and remains substantially horizontal. Alternately, the four openings may be located such that, when the frame unit 701 is lifted, the base 703 is imbalanced and tilts at a non-horizontal angle.

Moreover, the plurality of lifting devices 707 may include both embodiments combined (i.e., balanced and imbalanced), to include six or more openings such that the frame unit 701 may be hoisted with the base 703 remaining substantially horizontal, or at one or more non-horizontal angles, depending on which combination of openings of the lifting device 707 are coupled to the lifting machine, and on the weigh distribution on the base 703. The one or more non-horizontal angles may be set to coincide with a desired entry angle. For instance, an angled entry may be selected to avoid contact with the gas turbine engine 101 (FIG. 1), or for subsequent maneuvering and/or alignment after an initial landing.

Also for example, the plurality of lifting devices 707 may be symmetric with each other. In particular, the plurality of lifting devices 707 may include two openings on the inner side 704 and two openings on the outer side 705, all four located perpendicularly equidistant from the base 703 and perpendicularly equidistant from the centerline 702 (FIG. 5) of the base 703. In addition, each opening may be located between one diameter and two diameters from opposite edges of the inner side 704 and the outer side 705, respectively. Here, a "diameter" may include the maximum dimension of the respective opening in the direction perpendicular from the centerline 702. Also, the location of an opening may be measured at its center, at an edge, and/or consistently at any convenient point within.

Alternately, the plurality of lifting devices 707 may be non-symmetric with another. In particular, at least one opening on the inner side 704 or on the outer side 705 may be located at a perpendicular distance from the base 703 and/or perpendicular distance from the centerline 702 (FIG. 5) of the base 703 different from at least one other opening. To illustrate, a first opening on the inner side 704 and a first opening on the outer side 705 may be located perpendicularly equidistant from the base 703 and perpendicularly equidistant from the centerline 702 of the base 703, whereas a second opening on the inner side 704 and a second opening on the outer side 705 may be located, relative to each other, perpendicularly equidistant from the base 703 and perpendicularly equidistant from the centerline 702 of the base 703, but at a different perpendicular distance from the base 703 or perpendicular distance from the centerline 702 of the base 703 than the first openings.

Moreover, the plurality of lifting devices 707 may include both embodiments combined (i.e., symmetric and non-symmetric). In particular, the frame unit 701 may include six or more openings located at both symmetric and asymmetric locations such that the frame unit 701 may be hoisted at symmetrical or asymmetrical attach points, depending on which combination of openings of the lifting device 707 are selected. Also, depending on the weigh distribution on the base 703, selection of asymmetric openings may provide for a balanced lift, an imbalanced lift, or a tilted lift. Likewise, depending on the weigh distribution on the base 703, selection of symmetric openings may provide for a balanced lift, an imbalanced lift, or a tilted lift.

According to one embodiment, the plurality of lifting devices 707 may be configured for universal installation. In particular, using the disclosed plurality of lifting devices 707, the split fuel control module 700 may be installed in multiple installations and/or multiple configurations. Here, multiple installations may include multiple gas turbine engine packages 100. Similarly, multiple configurations may include variations in the positioning or orientation of the split fuel control module 700 within a single gas turbine engine package 100, and/or variations in the positioning or orientation of the individual frame units 701 within the gas turbine engine package 100. For example, the frame unit 701 may include additional lifting devices 707 for the multiple installations and/or multiple configurations. To illustrate, the frame unit 701 may include lifting devices 707 configured for multiple entry angles associated with different gas turbine engine packages 100. Alternately, the frame unit 701 may include lifting devices 707 configured for both a left hand and a right hand entry. Alternately, the frame unit 701 may include lifting devices 707 configured for the split fuel control module 700 to be installed forward facing or rearward facing (i.e., with the centerlines 702 of the bases 703 rotated 180 degrees).

According to one embodiment the plurality of lifting devices 707 may be positioned relative to the vertical weight distribution of the frame unit 701 when the base 703 is resting on a horizontal surface. In particular, the plurality of lifting devices 707 may be positioned above the center of gravity of the frame unit 701. For example, the inner side 704 and the outer side 705 may sufficiently extend vertically beyond the center of gravity, and the lifting devices 707 may be located at the top of the inner side 704 and the outer side 705, respectively. According to one embodiment, each opening may be between one diameter and two diameters from the tops of the inner side 704 and the outer side 705, respectively. Here, a "diameter" may include the maximum dimension of the respective opening in the vertical direction.

The fuel inlet 711 is an interface to couple with a fuel conduit to receive fuel from a fuel supply. In particular, the fuel inlet 711 may be any conventional fitting mating with the fuel supply. For example, the fuel inlet 711 may include a ¾" 150 LB ANSI RF flange. Also for example, the fuel inlet 711 may include a metric flange, or any conventional coupling meeting the particular specifications of the facility where the gas turbine engine 101 (FIG. 1) is located, and of the fuel system of the gas turbine engine 101. The fuel conduit may include any conventional fuel plumbing and intervening structures.

Figure 3:
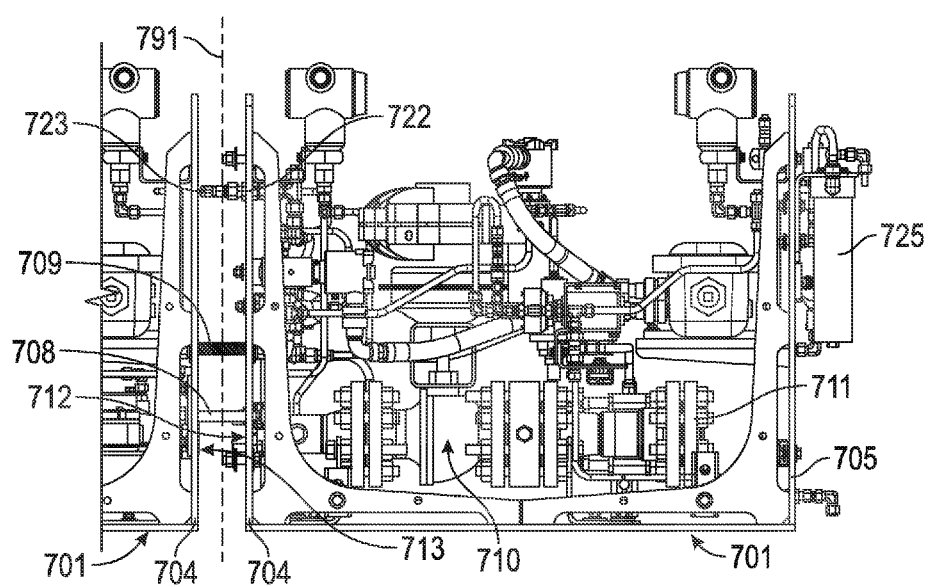
FIG. 3 is a partial side view of the split fuel control module of FIG. 2.

FIG. 3 is a partial side view of the split fuel control module of FIG. 2. In particular, two populated frame units 701 are shown separated apart at the frame unit interface 791.

The frame unit 701 may include an interface alignment guide 708. In particular, each frame unit 701 may include a fixed or removable interface alignment guide 708 configured to control movement and alignment over a range when two frame units 701 are joined together. The interface alignment guide 708 aligns the two frame units 701 with sufficient precision to maintain any required interface tolerances.

According to one embodiment, the interface alignment guide 708 may include two taper pins (with mating receptacles on the other frame unit 701). The taper pin may be made of a high strength material such as AISI 4340 steel, for example. The taper pin may have a diameter approximately 0.70" (1.78 cm), and extend from the inner side 704 of one frame units 701 for a length of approximately 4" (10.16 cm). The taper pin may taper approximately 0.25" diameter per foot of length (0.64 cm dia./31.5 cm len.). The taper pin may have a greater or lesser diameter, length, and/or taper as well.

Figure 5:
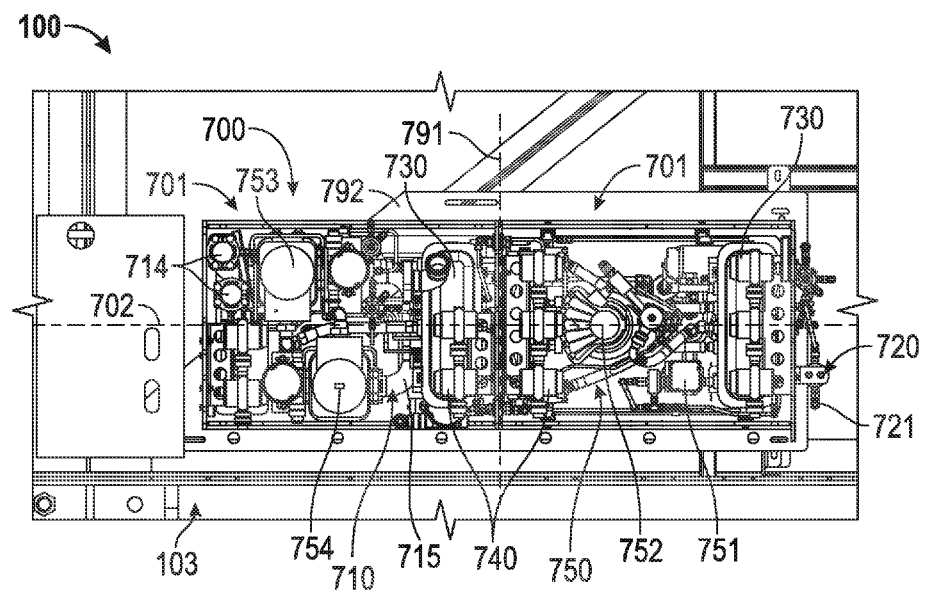
FIG. 5 is a top view of the split fuel control module of FIG. 2.

Each taper pin may be located on opposite sides of centerline 702 (FIG. 5). Also, both taper pins may be located on the inner side 704 of one frame unit 701, with the mating receptacles on the inner side 704 of the other frame unit 701. Alternatively, the taper pins may alternate, with one taper pin and one mating receptacle located on the inner side 704 of one frame unit 701, and with the other mating receptacle and the other taper pin located on the inner side 704 of the other frame unit 701.

The frame unit 701 may also include a mechanism for drawing two frame units 701 together such as a frame puller 709. In particular, each frame unit 701 may include a frame puller 709 configured to draw together and couple a first frame unit 701 and the second frame unit 701 over a range. Together the interface alignment guide 708 and the frame puller 709 may be used to draw two frame units 701 together in a guided manner for final assembly of the split fuel control module. For example, once the frame units 701 are in sufficient proximity, the frame puller 709 may engage, in conjunction with the interface alignment guide 708, and be used to draw each other together over the range until reaching their interface tolerances.

According to one embodiment, the frame puller 709 may include two threaded shafts and nuts. The threaded shaft and nut may be made of a high strength material such as AISI 4340 steel, for example. The threaded shaft may have a diameter approximately 0.70" (1.78 cm), and extend from the inner side 704 of one frame units 701 for a length of approximately 4" (10.16 cm). The threaded shaft may have a greater or lesser diameter and/or length as well, depending on the pulling forces and range required. Additional hardware such as washers, backing plates, etc. are contemplated.

Additionally and similar to the taper pins, the threaded shafts may be located on opposite sides of centerline 702 (FIG. 5). Also, both threaded shafts may be located on the inner side 704 of one frame unit 701, with mating receptacles on the inner side 704 of the other frame unit 701. Alternately, the threaded studs may alternate, with one threaded stud and one mating receptacle may be located on the inner side 704 of one frame unit 701, and with the other mating receptacle and the other threaded stud located on the inner side 704 of the other frame unit 701.

The upstream fuel interface 712 and the downstream fuel interface 713 (FIG. 3) are mating fittings that complete the fuel path across the frame unit interface 791. The upstream fuel interface 712 and the downstream fuel interface 713 are configured to be fluidly coupled once a first frame unit 701 and a second frame unit 701 are drawn together and coupled via the frame puller 709 (FIG. 3). According to one embodiment the upstream fuel interface 712 and the downstream fuel interface 713 may be mating flanges and may include an "O" ring or other seal therebetween.

According to one embodiment, the fuel inlet 711 may be recessed within frame unit 701, such that the segmented fuel path 710 may receive fuel from various supply interfaces. In particular, the fuel inlet 711 may be recessed inboard from the outer side 705 such that a bend, such as a ninety-degree coupling, may reside substantially within the frame unit 701 while turning. For example, the fuel inlet 711 may be recessed at least 7" (17.8 cm) inboard of the outer side 705. Also for example, the fuel inlet 711 may be recessed between 6" and 12" (15.2 cm-30.5 cm) inboard of the outer side 705. Also for example, the fuel inlet 711 may be recessed between inboard of the outer side 705. Also for example, the fuel inlet 711 may be recessed inboard of the outer side 705 at least the distance of diameter of the fuel inlet 711.

Figure 4:
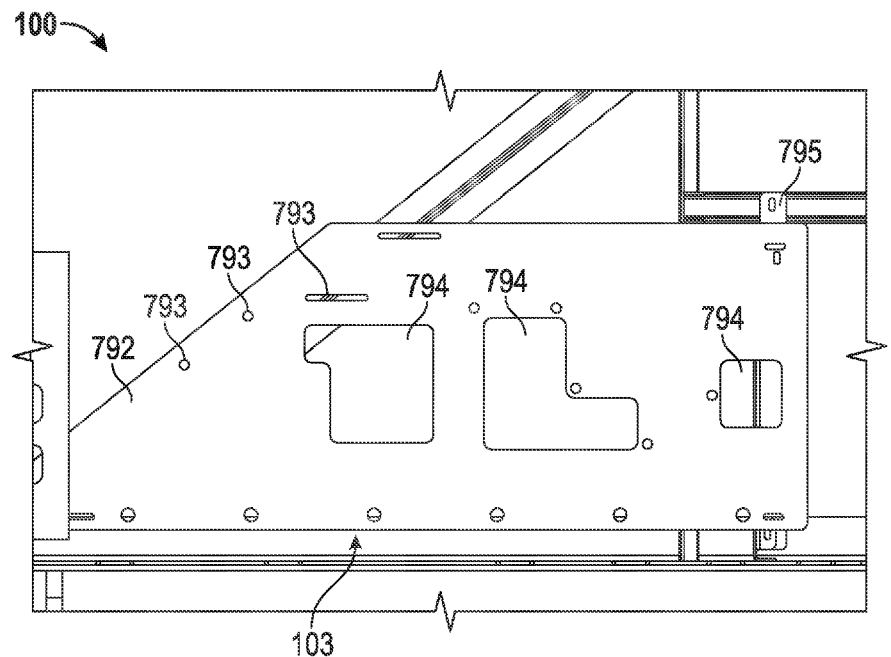
FIG. 4 is a partial top view of a support platform of the gas turbine engine package of FIG. 1, including a base plate for the split fuel control module of FIG. 2.

FIG. 4 is a partial top view of a support platform of the gas turbine engine package of FIG. 1, including a base plate for the split fuel control module of FIG. 2. In particular, a base plate 792 is shown mounted to and supported by the support platform 103. Furthermore, the base plate 792 is shown with the split fuel control module 700 (FIG. 2) uninstalled. In this view, both the gas turbine engine 101 and the enclosure 102 (FIG. 1) are removed for clarity.

The base plate 792 is a structural member configured to support a plurality of frame units 701 (FIG. 2). In particular, the base plate 792 mounts to the support platform 103 of the gas turbine engine package 100 and interfaces with the first and second frame units 701. Furthermore, the base plate 792 forms a single base between the bases 703 of first and second frame units 701, uniting them as a single unit. The base plate 792 may be made of plate steel, or any other structural material.

The base plate 792 includes a plurality of interface features. In particular, the base plate 792 includes attachment holes 793 for the support platform 103, attachment holes 793 for both frame units 701, and access holes 794. For example, the attachment holes 793 may be holes machined in the base plate 792 configured to receive fasteners. When assembled, the fasteners may join the base plate 792 to the support platform 103 and to both of the frame units 701. The fasteners may be any conventional fastener (e.g., bolts, screws, pins, etc.).

The access holes 794 may include cut outs of any convenient shape, size, and position to provide access to the frame units 701 (FIG. 2). For example, the access holes 794 may be positioned to provide sufficient clearance for a technician to reach in and couple the fasteners to the base plate 792 (e.g., positioned proximate the attachment holes 793), to provide access for a function of a component of the frame units 701 (e.g., drains), or for any other access need. In addition, the access holes 794 may be oversized beyond their functional requirements in order to reduce overall weight and/or material costs.

According to one embodiment, the base plate 792 may be configured for universal installation. In particular, using the disclosed base plate 792, the split fuel control module 700 may be configured to be installed in multiple installations and/or multiple configurations. Here, multiple installations may include multiple gas turbine engine packages 100, where there are variations in the installation of the base plate 792 and/or variations that include attaching one or more additional support brackets 795 to the base plate 792 with one or more installation positions. Similarly, multiple configurations may include variations in the positioning or orientation of the base plate 792 within a single gas turbine engine package 100, and/or variations in the positioning or orientation of the frame units 701 on top of the base plate 792.

For example, the attachment holes 793 may include additional holes for the multiple installations and/or multiple configurations. Alternately, the attachment holes 793 may be slotted, or otherwise providing for variable attach points, for the multiple installations and/or multiple configurations. Also for example, the access holes 794 may include additional or duplicate openings for the multiple installations and/or multiple configurations. Alternately, the access holes 794 may be shaped, enlarged, and/or positioned for the multiple installations and/or multiple configurations.

FIG. 5 is a top view of the split fuel control module of FIG. 2. In particular, two populated frame units 701 are shown installed into the gas turbine engine package 100, mounted to the support platform 103 via the base plate 792. In this view, both the gas turbine engine 101 and the enclosure 102 (FIG. 1) are removed for clarity. Each frame unit 701 is populated with its respective functional components, and is coupled to the other at the frame unit interface 791, together making the split fuel control module 700.

Each frame unit 701 supports a portion of the segmented fuel path 710 and a portion of the distributed fuel controller 750. Each frame unit 701 may further support a portion of the segmented air path 720, a terminal box 730, one or more transmitters 740, and other componentry.

The segmented fuel path 710 is a fuel flow path between a fuel supply and the fuel system of the gas turbine engine 101 (FIG. 1), and segmented across the frame unit interface 791. In particular, the segmented fuel path 710 includes a fuel inlet 711 (FIG. 2), an upstream fuel interface 712 (FIG. 3), a downstream fuel interface 713 (FIG. 3), a fuel outlet 714, and any suitable fluid conduit, piping, ducting, manifolds, etc. therebetween, including passageways though the various fluid components. The segmented fuel path 710, once assembled, is configured to deliver fuel received at from the fuel inlet 711 to the gas turbine engine 101 via the fuel outlet 714.

When the first frame unit 701 and the second frame unit 701 are drawn together and coupled, the upstream fuel interface 712 and the downstream fuel interface 713 may be within coupling tolerance. In particular, the frame puller 709 may be used to draw the upstream fuel interface 712 and the downstream fuel interface 713 precisely within coupling tolerance. For example when coupled via interface alignment guide 708 and the frame puller 709, the upstream fuel interface 712 and the downstream fuel interface 713 may be approximately centered and axially within 0.025" (0.64 cm) at the frame unit interface 791. Also for example, when coupled via interface alignment guide 708 and the frame puller 709, the upstream fuel interface 712 and the downstream fuel interface 713 may be approximately centered and axially between 0.015" (0.038 cm) and 0.020" (0.051 cm) at the frame unit interface 791.

The fuel outlet 714 is an interface configured to couple with a fuel conduit to deliver fuel to the fuel system of the gas turbine engine 101 (FIG. 1). In particular, the fuel outlet 714 is a fuel coupling that outputs pressurized and regulated fuel from the split fuel control module 700. For example, the fuel outlet 714 may include a ½" 150 LB ANSI RF flange. Also for example, the fuel outlet 714 may include a metric flange, or any other coupling meeting the particular specifications of the fuel system. According to one embodiment, the fuel outlet 714 may include a plurality of outlet lines. For example the fuel outlet 714 may include multiple interfaces with the fuel system of the gas turbine engine 101, including an outlet lines plumbed to and associated with the each fuel control valve of the distributed fuel controller 750 (e.g., a main fuel control valve 753, a pilot fuel control valve 754, and a torch fuel control valve).

According to one embodiment, the segmented fuel path 710 may minimize the couplings between the first and the second frame units 701. In particular, the segmented fuel path 710 may cross the frame unit interface 791 a single time. For example, where the fuel outlet 714 includes multiple interfaces with the fuel system of the gas turbine engine 101, the segmented fuel path 710 may include a single fuel path at the frame unit interface 791, and a manifold 715 that divides the single path of the segmented fuel path 710 into a plurality of flows downstream of the frame unit interface 791. For example, here, the manifold 715 (also see, FIG. 2) divides the segmented fuel path 710 into two flows, one going to a main fuel control valve 753, and one going to a pilot fuel control valve 754.

According to one embodiment, the segmented fuel path 710 may be configured for universal installation. In particular, using the disclosed segmented fuel path 710, the split fuel control module 700 may be configured to be installed with a plurality of gas turbine engine packages 100 (FIG. 1), in a plurality of positions on a gas turbine engine package 100, and/or having a plurality of external interfaces. For example, the fuel inlet 711 (FIG. 3) may be aligned with the centerline 702 of the base 703, such that the segmented fuel path 710 may receive fuel equally from either side. Additionally the upstream fuel interface 712 and the downstream fuel interface 713 (FIG. 3) may be aligned with the centerline 702 of the base 703 (FIG. 2), such that there is equal access to assemble the segmented fuel path 710 from either side and such that different manifolds 715 may be used (e.g., where a different number of fuel outlets 714 are present). Additionally one or more fuel outlets 714 (FIG. 3) may be aligned with the centerline 702 of the base 703 such that the segmented fuel path 710 may deliver fuel equally from either side.

The distributed fuel controller 750, which generally includes the assorted controllers and devices that interface with the segmented fuel path 710, controls and regulates fuel flow into the gas turbine engine 101 (FIG. 1). In particular, the distributed fuel controller 750 may be configured to provide fuel shutoff, pressure regulation, and/or flow regulation. The distributed fuel controller 750 includes a primary fuel shut-off valve 751, a main fuel control valve 753, and a pressure regulator. The primary fuel shut-off valve 751 may be located in an upstream portion of the segmented fuel path 710, and is configured to stop fuel flow within the segmented fuel path 710 when commanded. The main fuel control valve 753 is a metering flow valve that controls the main fuel powering the gas turbine engine 101. The pressure regulator may be integrated into the main fuel control valve 753, providing fuel to the gas turbine engine's main fuel system metered at both the required flow and pressure.

The distributed fuel controller 750 may further include a secondary fuel shut-off valve 752, a pilot fuel control valve 754, and a torch fuel control valve (not shown). The secondary fuel shut-off valve 752 is a redundant or "back up" shut-off valve, relative to the primary fuel shut-off valve 751, and is configured to stop fuel flow within the segmented fuel path 710 when commanded. The secondary fuel shut-off valve 752 may also be located in an upstream portion of the segmented fuel path 710. The pilot fuel control valve 754 and the torch fuel control valve may be configured to provide fuel metering control for independent fuel supplies to the gas turbine engine 101 (FIG. 1). For example, the pilot fuel system and the ignition torch may require independent flow rates, finer metering control, and/or independent interfaces with the fuel system of the gas turbine engine 101.

According to one embodiment, one or more fluid components of the distributed fuel controller 750 may be pneumatically activated or powered. In particular, at least one of the primary fuel shut-off valve 751, the secondary fuel shut-off valve 752, the main fuel control valve 753, the pilot fuel control valve 754, and the torch fuel control valve may be air-powered or air-assisted. As such, the air-powered or air-assisted component may also include an interface to the segmented air path 720.

The segmented air path 720 is an "instrument gas" system within the split fuel control module 700, segmented across the frame unit interface 791. "Instrument gas" is air or other gas that is clean, filtered, and pressurized. The instrument gas is typically supplied by the facility where the gas turbine engine package 100 is installed. The segmented air path 720 may include an air inlet 721, an upstream air interface 722 (FIG. 3), a downstream air interface 723 (FIG. 3), a supply outlet 724 (FIG. 4), a gas vent, and any suitable fluid conduit, piping, air lines, manifolds, etc., therebetween.

According to one embodiment, the split fuel control module 700 may also be configured independently ensure air quality and/or provide redundant protection. In particular, the segmented air path 720 may include its own air filter 725 (FIG. 3), which is independent and in addition to any external filter of the air supply. The air filter 725 may be embodied as an assembly and configured to clean air received at the air inlet 721 prior to being delivered to any supply outlet 724 (FIG. 4). For example, the air filter 725 maybe located downstream but proximate the air inlet 721. Additionally, the air filter 725 may be mounted directly to the frame unit 701. For example, as illustrated, the air filter 725 may be mounted to the outer side 705 (FIG. 3) and support the air inlet 721.

Once coupled, the segmented air path 720 is configured to deliver instrument gas received at the air inlet 721 to one or more fluid components of the distributed fuel controller 750 via the supply outlet 724. In particular, the upstream air interface 722 (FIG. 3) and the downstream air interface 723 (FIG. 3) are configured to be pneumatically coupled once a first frame unit 701 and a second frame unit 701 are drawn together and coupled via the frame puller 709 (FIG. 3). In addition, the supply outlet 724 may include a plurality of air lines adapted to pneumatically couple with one or more components onboard the split fuel control module 700. For example, the supply outlet 724 may include a manifold or other conventional flow divider and the associated hardware and conduit to pneumatically couple with at least one of the primary fuel shut-off valve 751, the secondary fuel shut-off valve 752, the main fuel control valve 753, a pilot fuel control valve 754, and a torch fuel control valve.

According to one embodiment the segmented air path 720 may include one or more quick-release couplings. In particular, the air inlet 721, the upstream air interface 722, the downstream air interface 723, the supply outlet 724, and/or the gas vent may include a pneumatic coupling that can be coupled/decoupled without the use of tools. For example this may include a detent/slide-collar coupling, a quarter turn coupling, or any conventional coupling meeting the particular specifications of the pressurized gas/clean air supply and the instrument gas system of split fuel control module 700.

The terminal box 730 is an enclosed junction where power enters the frame unit 701, and is routed to the various components onboard. The terminal box 730 may include an enclosure, a power bus inside its enclosure, and a standard power receptacle 731 (FIG. 2) accessible from outside its enclosure. Electrically-powered components of each frame unit 701 may be electrically coupled to the power bus. According to one embodiment, the terminal box 730 may also receive and route communications lines. According to one embodiment, the terminal box 730 may take an elongated shape, perpendicular to the centerline 702 of the frame unit 701, wherein its power receptacle 731 is located at an end away from the centerline 702 and accessible from the side of the frame unit 701.

According to another embodiment, each frame unit 701 may include its own terminal box 730. In particular, the electrically-powered components of each frame unit 701 may be electrically coupled to a local terminal box 730. For example, each local terminal box 730 may include its own power supply and be isolated from another frame unit 701, without frame-to-frame connections. Alternately, the first frame unit 701 may receive offboard power and then supply power to the second frame unit 701.

According to one embodiment the terminal box 730 may be configured for universal installation. In particular, each terminal box may be configured as a local power supply for a single frame unit 701, and further configured to receive power from various supplies. For example, as above, all electrically-powered components of each frame unit 701 may be electrically powered by a local terminal box 730, and the terminal box 730 may include multiple power receptacles 731. According to one embodiment, the terminal box 730 may include power receptacles 731 on opposite ends of the terminal box 730 such that a power plug may be engaged from either of the frame unit 701. In addition, the same terminal box 730 may include an inboard power receptacle 731 (FIG. 2) configured to receive power from another terminal box 730. Where multiple frame unit 701 are used, a terminal box 730 may include two inboard power receptacles 731, one configured to receive and one configured to supply power in a daisy chain.

The transmitter 740 is a communication device that communicates feedback regarding the split fuel control module 700. According to one embodiment, the transmitter 740 may receive commands from a remote controller such as in control panel 107 (FIG. 1). As illustrated, the split fuel control module 700 may include multiple transmitters 740, relaying multiple measurements. According to one embodiment, the multiple transmitters 740 may include redundant or back-up transmitters 740 that provide duplicative information.

Each transmitter 740 may include a component interface and a data output. The component interface may include a communication link, a sensor, or any combination thereof. The component interface is configured to receive measurements such as pressure, flow rates, state/state changes, etc. Likewise, the data output may include a communication link, a data display, or any combination thereof. The data output is configured to relay the received measurements to a remote controller or display (e.g., control panel 107) and/or to display the received measurements in situ. According to one embodiment, the transmitter 740 may include a processor configured to convert the received measurements to a viewable or communicable format.

According to one embodiment, the transmitter 740 may be configured for universal installation as well. In particular, the transmitter 740 may be configured to be installed with a plurality of gas turbine engine packages 100 (FIG. 1), in a plurality of positions on a gas turbine engine package 100, and/or having a plurality of external interfaces. For example, where the transmitter 740 includes a viewable data display, it may be aligned with the centerline 702 of the base 703 (FIG. 2), such that the transmitter 740 is equally readable from either side of the centerline 702. Alternately, the transmitter 740 may include duplicative data displays, such that the transmitter 740 may be viewed, independent of which gas turbine engine package 100 installation and/or configuration it is used. Additionally, the transmitter 740 may include duplicative data outputs, such that the transmitter 740 may be equally accessed, independent of which gas turbine engine package 100 installation and/or configuration it is used.

INDUSTRIAL APPLICABILITY

The present disclosure generally applies to a split fuel control module for a gas turbine engine. The described embodiments are not limited to use in conjunction with a particular type of gas turbine engine or any type of fuel. Gas turbine engines, and thus their components and support systems, may be suited for any number of industrial applications, such as, but not limited to, various aspects of the oil and natural gas industry (including include transmission, gathering, storage, withdrawal, and lifting of oil and natural gas), power generation industry, aerospace and transportation industry, to name a few examples.

Generally, embodiments of the presently disclosed split fuel control module are applicable to the use, operation, maintenance, repair, and improvement of gas turbine engines, and may be used in order to improve performance and efficiency, decrease maintenance and repair, and/or lower costs. In addition, embodiments of the presently disclosed split fuel control module may be applicable at any stage of the gas turbine engine's life, from design to prototyping and first manufacture, and onward to end of life. Accordingly, the split fuel control module may be used in conjunction with a retrofit or enhancement to existing gas turbine engine, as a preventative measure, or even in response to an event.

In particular, the presently disclosed split fuel control module may provide for increased fuel controller upgrades, economical retrofitting, and universal installation. As sufficient advancements become available in fuel controller componentry to warrant and upgrade of the entire module, the disclosed split fuel control module provides for the upgrade without having the added cost of first removing the gas turbine engine or the need to wait for a regularly scheduled engine removal. Instead, the split fuel control module may be installed with the gas turbine engine installed.

Moreover, by splitting the fuel control module for installation, a retrofit or upgrade may be easier and less cumbersome. In particular, by essentially splitting the fuel control module in two, it becomes easier to install into the gas turbine engine package. For example, being half the size, each half is lighter and more maneuverable to install. Also, lower cost lifting approaches may become an option. In addition, the smaller size may include incidental benefits such as being able to readily install each half though a single access port or doorway.

Also, the inclusion of features for universal installation may provide the additional benefits associated with having a single design and multiple options for use in multiple installations and/or multiple configurations, which may have been customized to a unique gas turbine engine package or facility interfaces.

Figure 6:
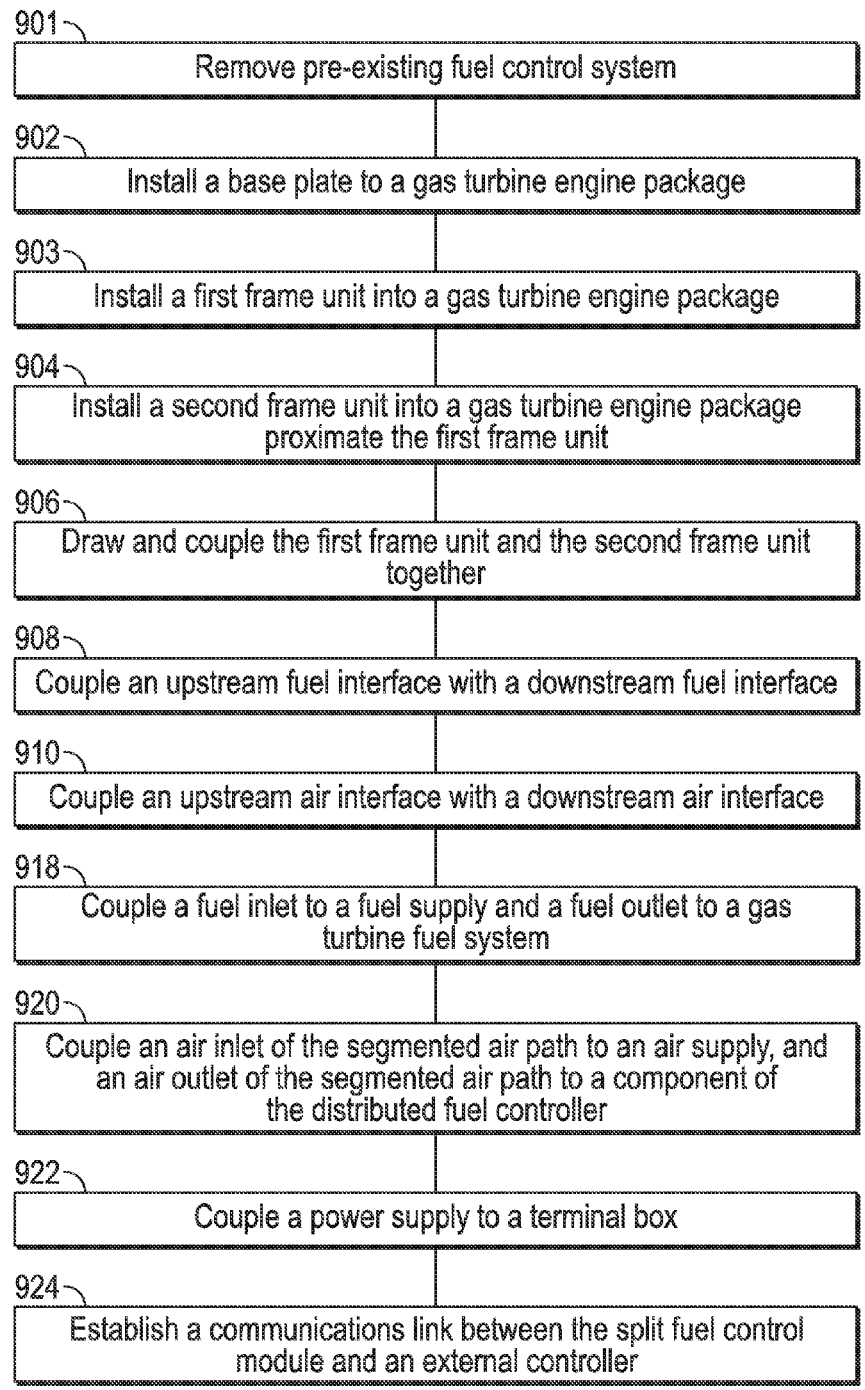
FIG. 6 is a flow chart of an exemplary method for installing a split fuel control module.

FIG. 6 is a flow chart of an exemplary method for installing a split fuel control module. In particular, a gas turbine engine package 100 may be modified, retrofitted, or manufactured as described above using the following method, the above description, or a combination thereof. As illustrated (and with reference to FIGS. 1-5), the gas turbine engine package 100 may be modified by installing the split fuel control module 700.

The method begins with mechanically installing the split fuel control module into the gas turbine engine package. In particular, the method may include installing a first frame unit into a gas turbine engine package 903, and installing a second frame unit into the gas turbine engine package proximate the first frame unit 904. These may be predicated on the removal of any pre-existing fuel control system 901. A pre-existing fuel control system might be a "module" or could be non-modularized collection of components performing the same function.

Installing the first and second frame units 903, 904 may be further predicated by fastening or installing a base plate to the gas turbine engine package 902. Where a base plate is used, installing the first and second frame units 903, 904 may include fastening the first frame unit to the base plate, and fastening the second frame unit to the base plate. Also, installing the base plate to the gas turbine engine package 902 may include attaching one or more additional support brackets to the base plate and/or the support platform.

In addition, installation of the frame units may include a temporary positioning of the first and second frame units, followed by a subsequent alignment and securing to the gas turbine engine package directly or via the base plate. For example, the subsequent alignment and securing may be performed after the first and second frame units are coupled. Also for example, installation of the frame units may include vertically lowering the frame unit alongside the gas turbine engine to the base plate, then sliding the frame unit into position to mount the frame unit to the base plate.

Once the first and second frame units are proximate each other, the method may include drawing and coupling the first frame unit and the second frame unit together 906, According to one embodiment, drawing and coupling the first frame unit and the second frame unit together 906 may include aligning the first and second frame units with each other using an interface alignment guide, and drawing them together using a frame puller, as discussed above. For example, one or more nuts may be tightened on one or more threaded shafts while attached to each frame unit's inner side and while one or more taper pins are engaged to guide their travel.

The method further includes coupling a segmented fuel path broken across segmented across a frame unit interface. In particular, the method includes coupling an upstream fuel interface with a downstream fuel interface 908. For example, coupling the upstream fuel interface with the downstream fuel interface 908 may include fluidly coupling mating flanges using a seal therebetween as discussed above. Alternately, coupling the upstream fuel interface with the downstream fuel interface 908 may include fluidly coupling the segmented fuel path using any conventional means.

The method may further include coupling a segmented air path broken across segmented across the frame unit interface. In particular, the method may include coupling an upstream air interface with a downstream air interface 910. For example, coupling the upstream air interface with the downstream air interface 910 may include pneumatically coupling mating fittings using a quick-release coupling as discussed above. Alternately, coupling the upstream air interface with the downstream air interface 910 may include pneumatically coupling the segmented air path using any conventional means.

The method further includes fluidly installing the split fuel control module into the fuel system of gas turbine engine package 100. In particular, the method may include coupling a fuel inlet to a fuel supply and a fuel outlet to a gas turbine fuel system 918. For example, coupling the fuel inlet to the fuel supply and the fuel outlet to the gas turbine fuel system 918 may include fluidly coupling mating flanges between fuel inlet and the fuel supply, and include fluidly coupling mating flanges between the fuel outlet and gas turbine fuel system, as discussed above. Alternately, coupling a fuel inlet to a fuel supply and a fuel outlet to a gas turbine fuel system 918 may include fluidly coupling the split fuel control module using any conventional means.

According to one embodiment, the fuel outlet may include a plurality of outlets. For example the gas turbine fuel system may use independent fuel supplies for a main fuel system, a pilot fuel system, and/or torch fuel system. Accordingly, the fuel outlet may include separate mating interfaces and be coupled to each independent system.

According to another embodiment, the split fuel control module may require more than one segmented fuel path. In particular, the gas turbine engine may operate on various types of fuels, as discussed above, and coupling the fuel inlet to the fuel supply and the fuel outlet to the gas turbine fuel system 918 may include fluidly coupling a plurality of fuel inlets and a plurality of fuel outlets, respectively. In addition, coupling the upstream fuel interface with the downstream fuel interface 908 may include fluidly coupling a plurality of upstream fuel interfaces with a plurality of downstream fuel interfaces. For example, where two fuels are sufficiently dissimilar, each may include its own independent segmented fuel path.

The method may further include supplying pneumatic power to the split fuel control module. In particular, the method may include coupling an air inlet of the segmented air path to an air supply, and an air outlet of the segmented air path to a component of the distributed fuel controller 920. For example, coupling the air inlet of the segmented air path to the air supply may include coupling the air inlet to an off board instrument gas system using quick-release couplings. Also for example, coupling the air outlet of the segmented air path to the component of the distributed fuel controller may include coupling the air outlet to one or more air-powered and/or air-assisted fuel valves using quick-release couplings. Alternately, coupling the air inlet and the air outlet of the segmented air path may include pneumatically coupling the segmented air path using any conventional means.

The method may further include supplying electrical power to the split fuel control module. In particular, the method may include coupling a power supply to a terminal box 922. For example, coupling the power supply to the terminal box 922 may include plugging in independent power supplies to separate terminal boxes, one on each frame unit. Accordingly, where a first terminal box is mounted to the first frame unit and a second terminal box is mounted to the second frame unit, coupling the power supply to the terminal box 922 may include coupling a second power supply to the second terminal box. Alternately, coupling the power supply to the terminal box 922 may include electrically coupling a single power supply to the first terminal box on the first frame unit, and electrically coupling the first terminal box with the second terminal box using any conventional electrical couplings.

The method may further include communicably coupling the split fuel control module with the fuel system of gas turbine engine package 100. In particular, the method may include establishing a communications link between the split fuel control module and an external controller 924. For example, establishing a communications link between the split fuel control module and an external controller 924 may include plugging a wired communications link into the terminal box, wherein the terminal box includes a communications bus or other communications router. Alternately, establishing a communications link between the split fuel control module and an external controller 924 may include a wireless communications link with the terminal box, wherein the terminal box includes a communications bus or other communications router. Also for example, establishing a communications link between the split fuel control module and an external controller 924 may include establishing a dedicated communications link between an external controller and one or more components onboard the split fuel control module.

The preceding detailed description is merely exemplary in nature and is not intended to limit the invention or the application and uses of the invention. The described embodiments are not limited to use in conjunction with a particular type of gas turbine engine. Hence, although the present embodiments are, for convenience of explanation, depicted and described as being implemented in a stationary gas turbine engine, it will be appreciated that it can be implemented in various other types of gas turbine engines, and in various other systems and environments. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

What is claimed is:

1. A split fuel control module for a gas turbine engine, the split fuel control module comprising:

a first frame unit, the first frame unit including a first base and a first inner side, the first inner side joined to and extending perpendicularly from the first base;

a second frame unit, the second frame unit including a second base and a second inner side, the second inner side joined to and extending perpendicularly from the second base, the second inner side configured to align and couple with the first inner side;

a segmented fuel path, the segmented fuel path including a fuel inlet configured to receive fuel from a fuel supply, an upstream fuel interface, a downstream fuel interface, and a fuel outlet configured to deliver fuel to the gas turbine engine, the upstream fuel interface fixed to the first frame unit, the downstream fuel interface fixed to the second frame unit and configured to mate with the upstream fuel interface when the first inner side is aligned and coupled to the second inner side;

a distributed fuel controller, the distributed fuel controller including a primary fuel shut-off valve and a main fuel control valve, a first portion of the distributed fuel controller fixed to the first frame unit and a second portion of the distributed fuel controller fixed to the second frame unit.

2. The split fuel control module of claim 1, wherein the first frame unit, further includes a first outer side, the first outer side located opposite the first base from the first inner side, the first outer side joined to and extending perpendicularly from the first base; and wherein the second frame unit, further includes a second outer side, the second outer side located opposite the second base from the second inner side, the second outer side joined to and extending perpendicularly from the second base.

3. The split fuel control module of claim 2, wherein the first frame unit and the second frame unit each have a center of gravity, respectively;

wherein the first inner side includes a first plurality of inner side lifting devices, the first plurality of inner side lifting devices located above the center of gravity of the first frame unit;

wherein the first outer side includes a first plurality of outer side lifting devices, the first plurality of outer side lifting devices located above the center of gravity of the first frame unit;

wherein the second inner side includes a second plurality of inner side lifting devices, the second plurality of inner side lifting devices located above the center of gravity of the second frame unit; and wherein the second outer side includes a second plurality of outer side lifting devices, the second plurality of outer side lifting devices located above the center of gravity of the second frame unit.

4. The split fuel control module of claim 3, wherein the first base is rectangular and includes a centerline, the centerline normal to both the first inner side and the first outer side;

wherein the first plurality of inner side lifting devices includes a first inner side lifting device located at a first perpendicular distance from the centerline, and further includes a second inner side lifting device located at a second perpendicular distance opposite the first centerline, the first perpendicular distance different from the second perpendicular distance; and wherein the first outer plurality of lifting devices includes a first outer side lifting device located at the first perpendicular distance from the centerline, and further includes a second outer side lifting device located at the second perpendicular distance opposite the first centerline.

5. The split fuel control module of claim 1, further comprising:
   a frame puller configured to draw together and couple the first frame unit and the second frame unit; and
   an interface alignment guide coupled to the first frame unit, the interface alignment guide configured to guide the first frame unit and the second frame unit into alignment over a range where the frame puller may draw the first frame unit and the second frame unit together.

6. The split fuel control module of claim 5, wherein the frame puller includes a threaded shaft and a nut; and
   wherein the interface alignment guide includes a taper pin.

7. The split fuel control module of claim 1, wherein the frame puller is further configured to draw the upstream fuel interface and the downstream fuel interface within 0.025" of each other.

8. The split fuel control module of claim 1, wherein the first base is rectangular and includes a centerline, the centerline normal to both the first inner side and the first outer side;
   wherein the first frame unit further includes a first side support configured structurally as a corner brace, the first side support coupled to and extending orthogonally from the first base, the first inner side, and the first outer side; and
   wherein the first frame unit further includes a second side support configured structurally as a corner brace, the second side support coupled to and extending orthogonally from the first base, the first inner side, and the first outer side, the second side support opposite the centerline from the first side support.

9. The split fuel control module of claim 1, further comprising:
   a secondary fuel shut-off valve;
   a pilot fuel control valve; and
   a segmented air path, the segmented air path including
      an air inlet configured to receive instrument gas from an instrument gas supply,
      an upstream air interface fixed to the first frame unit,
      a downstream air interface fixed to the second frame unit and detachably coupled to the upstream air interface, and
      a supply outlet configured to deliver fuel to at least one component of the distributed fuel controller.

10. The split fuel control module of claim 1, further comprising a terminal box, the terminal box including an enclosure, a power bus inside the enclosure, and a power receptacle accessible from outside the enclosure.

11. A gas turbine engine package comprising:
    a gas turbine engine;
    a support platform; and
    the split fuel control module of claim 1, the split fuel control module fluidly coupled to the gas turbine engine, and mounted to the support platform.

12. A split fuel control module for a gas turbine engine, the split fuel control module comprising:
    a first frame unit, the first frame unit including a first base and a first inner side, the first inner side joined to and extending perpendicularly from the first base;
    a second frame unit, the second frame unit including a second base and a second inner side, the second inner side joined to and extending perpendicularly from the second base, the second inner side configured to align and couple with the first inner side;
    a fuel inlet;
    a fuel outlet configured to deliver fuel to the gas turbine engine;
    an upstream fuel interface fixed to the first frame unit;
    a downstream fuel interface fixed to the second frame unit and detachably coupled to the upstream fuel interface;
    a primary fuel shut-off valve fixed to the first frame unit; and
    a main fuel control valve fixed to the second frame unit.

13. The split fuel control module of claim 12, wherein the first base is rectangular and includes a centerline, the centerline normal to both the first inner side and the first outer side;
    wherein the first frame unit, further includes a first outer side, the first outer side located opposite the first base from the first inner side, the first outer side joined to and extending perpendicularly from the first base; and
    wherein the first frame unit further includes a first side support configured structurally as a corner brace, the first side support coupled to and extending orthogonally from the first base, the first inner side, and the first outer side; and
    wherein the first frame unit further includes a second side support configured structurally as a corner brace, the second side support coupled to and extending orthogonally from the first base, the first inner side, and the first outer side, the second side support opposite the centerline from the first side support; and
    wherein the second frame unit, further includes a second outer side, the second outer side located opposite the second base from the second inner side, the second outer side joined to and extending perpendicularly from the second base.

14. The split fuel control module of claim 13, wherein the first frame unit and the second frame unit each have a center of gravity, respectively;
    wherein the first inner side includes a first plurality of inner side lifting devices, the first plurality of inner side lifting devices located above the center of gravity of the first frame unit;
    wherein the first outer side includes a first plurality of outer side lifting devices, the first plurality of outer side lifting devices located above the center of gravity of the first frame unit;
    wherein the second inner side includes a second plurality of inner side lifting devices, the second plurality of inner side lifting devices located above the center of gravity of the second frame unit; and
    wherein the second outer side includes a second plurality of outer side lifting devices, the second plurality of outer side lifting devices located above the center of gravity of the second frame unit.

15. The split fuel control module of claim 14, wherein the first base is rectangular and includes a centerline, the centerline normal to both the first inner side and the first outer side;
    wherein the first plurality of inner side lifting devices includes a first inner side lifting device located at a first perpendicular distance from the centerline, and further includes a second inner side lifting device located at a second perpendicular distance opposite the first centerline, the first perpendicular distance different from the second perpendicular distance; and
    wherein the first outer plurality of lifting devices includes a first outer side lifting device located at the first perpendicular distance from the centerline, and further includes a second outer side lifting device located at the second perpendicular distance opposite the first centerline.

16. The split fuel control module of claim 12, further comprising:
    a frame puller including a threaded shaft and a nut, the frame puller configured to draw together and couple the first frame unit and the second frame unit; and an interface alignment guide including a taper pin, the interface alignment guide configured to guide the first frame unit and the second frame unit into alignment over a range where the frame puller may draw the first frame unit and the second frame unit together.

17. The split fuel control module of claim 12, wherein the frame puller is further configured to draw the upstream fuel interface and the downstream fuel interface within 0.025" of each other.

18. The split fuel control module of claim 12, further comprising:
   a secondary fuel shut-off valve;
   a pilot fuel control valve; and
   a terminal box, the terminal box including an enclosure, a power bus inside the enclosure, and a power receptacle accessible from outside the enclosure.

19. The split fuel control module of claim 12, further comprising a segmented air path, the segmented air path including
   an air inlet configured to receive instrument gas from an instrument gas supply,
   an upstream air interface fixed to the first frame unit,
   a downstream air interface fixed to the second frame unit and detachably coupled to the upstream air interface, and
   a supply outlet configured to deliver fuel to at least one component of the distributed fuel controller.

20. The split fuel control module of claim 12, further comprising a base plate; and
   wherein the first frame unit and the second frame unit are mounted to the base plate.

* * * * *